United States Patent [19]

Jones

[11] 4,275,949
[45] Jun. 30, 1981

[54] METHOD OF AND MEANS FOR SCANNING IMAGES

[76] Inventor: Neal K. Jones, 88 Gladstone Rd., North Brighton, South Australia, Australia

[21] Appl. No.: 134,575

[22] Filed: Mar. 27, 1980

Related U.S. Application Data

[63] Continuation-in-part of Ser. No. 894,932, Apr. 10, 1978, abandoned.

[30] Foreign Application Priority Data

Apr. 13, 1977 [AU] Australia .............................. PC9731

[51] Int. Cl.³ .............................................. G02B 27/17
[52] U.S. Cl. ...................................... 350/6.3; 358/198
[58] Field of Search ................ 350/6.3, 6.1, 7, 55, 350/27, 46, 294, 188; 250/599; 358/7.6, 198

[56] References Cited

U.S. PATENT DOCUMENTS

| | | | |
|---|---|---|---|
| 3,206,608 | 9/1965 | Aulin | 350/6.1 |
| 3,508,068 | 4/1970 | Harris et al. | 350/6.5 |
| 3,588,517 | 6/1971 | Maxwell | 350/6.3 |
| 3,864,567 | 2/1975 | Bezy | 350/6.3 |
| 3,899,145 | 8/1975 | Stephenson | 350/6.3 |

*Primary Examiner*—John K. Corbin
*Assistant Examiner*—B. W. de los Reyes
*Attorney, Agent, or Firm*—Kinzer, Plyer, Dorn & McEachran

[57] ABSTRACT

A method and means of scanning the image of a detector along a scan line in the field of view in which a moving auxiliary optical system is used to scan the image field of a primary spherical mirror optical system of wide angular field and inadequate definition and correcting the aberrations of the primary collecting system by means of the auxiliary optocal system.

14 Claims, 15 Drawing Figures

METHOD OF AND MEANS FOR SCANNING IMAGES

This application is a continuation-in-part of application Ser. No. 894,932 now abandoned.

BACKGROUND OF THE INVENTION

This invention teaches a method and means for scanning an object field to produce an image, wherein the aim is to achieve as great a performance as possible in a compact equipment. In order to achieve this aim it is necessary to ensure that the total optical system can be corrected to the limit set by diffraction; that the smallest possible detectors available can be utilized; that an array of many detectors can be used, if necessary, to increase total performance, without sacrificing the individual performance of each detector; that a hgh relative aperture of the whole optical system can be achieved if required; and that a wide angular field of view can be scanned in two directions.

A further aim of the invention is to utilize methods of achieving the above technical aim in a manner which will minimize the cost of fabrication.

The scanning means described in this invention has many features in common with Harris and Neiswander (U.S. Pat. No. 3,508,068) or Maxwell (U.S. Pat. No. 3,588,517) who teach a means of scanning wherein a fixed primary optical objective focuses a radiation image on to a spherical focal surface, in which focal surface is mounted a series of apertures on a rigid member. With Harris and Neiswander the apertured rigid member is fixed in position, the apertures being scanned by an optical relay system rotating about an axis passing through the center of curvature of the spherical image surface, whereas with Maxwell the apertured member rotates about an axis passing through the center of curvature of the spherical image surface, and with each aperture is associated a small relay lens fixed to and rotating with the said apertured member.

In the invention of Harris and Neiswander radiation is directed off the rotating member, to be focused on the axis of rotation of the rotating member by means of a multi-sided pyramidal reflecting prism. In the case of Maxwell the radiation is focused at the center of curvature of the focal surface. In either case a stationary detector is placed at the final focal point of the radiation whereby to provide an electrical signal which is amplified and presented on an output device to form an image.

In the invention of Harris and Neiswander the basic invention describes only a single line scan in (say) the horizontal direction. To provide a vertical scan a second device such as a rotating plane mirror is interposed between the scanning device and the object field; or the whole scanning system is mounted on a platform which is rotated about a horizontal axis. Maxwell's invention is specifically devised with its arrangement of apertures to provide a two-dimensional scan by use of a single detector, and without a rotating plane mirror.

If an array of detectors were to be used for greater performance with respect to a single detector, difficulty would be experienced in the Harris and Neiswander arrangement due to rotation of the image of the detector array projected through the moving optical system, relative to the apertures in the grid rotating in the primary focal surface. This difficulty would not be experienced with the arrangment of Maxwell wherein the radiation is focused at the center of curvature of the focal surface.

The angular resolution of the scanning systems of the inventions of Harris and Neiswander and of Maxwell are determined by the dimension of the scanning apertures relative to the focal length of the primary optical system. In order to resolve the angular resolution so calculated, simultaneously with utilizing the full available aperture of the optical system, it is essential to use a highly corrected primary optical system. In both Harris and Neiswander and Maxwell, a concentric correcting element of the Bouwers-Maksutov type is described in conjunction with a spherical mirror. Where infrared radiation is to be passed by the scanning system, the transparent material required for the correcting element would be expensive.

To achieve compactness of the scanning arrangement, which is part of the aim of this invention, requires both the focal length and the entrance aperture of the primary optics to be as small as possible consistent with a required performance. To achieve high resolution, simultaneously, demands such small apertures in the scanning grids referred to above as to render them difficult to fabricate. For example, a resolution of 0.1 milliradian with optics of 75 mm focal length and 100 mm optical aperture, requires a grid aperture size of 0.0075 mm.

Furthermore, the Bouwers-Maksutov correcting element in front of the spherical primary mirror must be made of material transmitting to the incident radiation and must be fabricated very precisely by grinding and polishing to very close tolerances. If a very wide field of view, for example 150°, is required, the resulting dome is very deep which is difficult to work, and if made of infrared transmitting material requires a substantial amount of expensive material. The expense of the material and the cost of working the correcting component are avoided in this invention, because the function of this large component is performed by a number of very much smaller components which may be made of cheaper materials.

The arrangement of Stephenson (U.S. Pat. No. 3,899,145) also has features in common with the arrangements of Harris and Neiswander, and Maxwell, in using a Bouwers-Maksutov correcting element in front of the primary spherical mirror to correct aberrations. However Stephenson's arrangement is designed to project a laser beam rather than to collect radiation at low intensity and focus the radiation on to a small detector. Specifically, the arrangement does not permit multiplication of the sets of optical elements about the axis of rotation of the rotating member to provide several scans for each revolution of the rotating member; and the detector used has, relatively, a very large area.

As described previously the arrangement of the present invention dispenses with the need for a correcting element in front of the primary mirror; enables the radiation to be focused precisely on to a very small detector approaching in size the diffraction limit of the optical system; permits the use of a large number of detectors in an array to achieve greatly enhanced performance over a single detector; and permits multiplication of the sets of optical elements on the rotating member about the axis of rotation of that member.

In an arrangement described by Bez (U.S. Pat. No. 3,864,567) a multiplicity of primary optical systems is mounted on the rotating member with other components of the optical systems. The result is an arrangement which would require much greater driving power, and a heavier construction, for a given performance, than would be required in the arrangements of Harris and Neiswander, Maxwell, Stephenson, or of this invention.

Alternatively, Aulin (U.S. Pat. No. 3,206,608) describes an arrangement for scanning an image which has some features in common with this invention and those of Harris and Neiswander, Maxwell and Stephenson, but dispenses with the correcting element in front of the primary collecting mirror. In Aulin's arrangement a negative lens element is shown which is disposed to focus the radiation from the primary mirror on to the center of curvature of the primary mirror, and which is mounted on a rotating arm whose axis of rotation passes thru the center of curvature of the primary mirror, a detector being mounted at this center. It can be shown easily that a high relative aperture and a definition approaching the diffraction limit could not be achieved simultaneously by this simple arrangement, but can be achieved by the arrangement of this invention.

In addition to the above-described improvements on the prior art, this invention includes the following features to improve the overall performance:

(1) introduction of an oblique mirror in front of the primary mirror and the rotating member, to reduce the obstruction of the incoming radiation by the rotating member
(2) means to minimize noise in the detector by eliminating unwanted radiation from the detector
(3) a number of means for introducing a second scan
(4) means for stabilizing the line-of-sight in a compact arrangement
(5) means for removing rotation of the axis of the cone of rays incident on the detector
(6) means for scanning a plane or spherical object field at a finite distance in front of the primary spherical mirror.

The means for achieving these optical features will become clear in the following description of the preferred embodiments.

SUMMARY OF THE INVENTION

This invention overcomes the above described difficulties to achieve the earlier stated aims by eliminating the transmitting, correcting element in the primary optical system as described by Harris and Neiswander, and Maxwell, and achieving overall correction of the total optical system between the object scene and the focus on the axis of rotation of the rotating member, by suitably adjusting the spacings and surfaces of the elements of the rotating optical assemblies between the imperfect image formed at the spherical focal surface of the primary mirror objective, and the focus on the axis of rotation. By ensuring that correction is carried out to a sufficient degree for image points off the axis of any of the rotating optical assemblies, a number of detectors may be used in place of a single detector. Either transmitting or reflecting optical elements or combinations of both types might by used in the rotating optical assemblies and moderate correction can be achieved using spherical surfaces only, but to achieve the highest performance in a compact system it is essential to use aspheric surfaces.

Reflecting surfaces can be used exclusively in this invention which therefore provides a system usable over an extremely wide band of wavelengths, whereas Harris and Neiswander, and Maxwell, are limited by the transmission properties of the refractive corrector plate.

In the arrangement of Harris and Neiswander the detector is located at the focal point on the axis of rotation of the rotating member; in the arrangement of Maxwell the detector is located at the center of curvature of the primary focal surface after a stationary, thick plano-spherical lens to converge the rays on to the detector. A more convenient location of the detector may be achieved by use of a stationary, plane mirror arranged to intercept the rays before the center of curvature of the primary focal surface and direct them laterally in a direction generally parallel to the axis of rotation, the detector being located at this new focal point.

Maxwell's arrangment is directed to the use of a single detector and for this purpose the lens described possibly is adequate. If an array of many detectors is to be used for increased performance, the plano-spherical lens may not suffice. It is advantageous in this case to employ a more elaborate optical system, stationary with respect to the primary mirror, which refocuses on to the detector the radiation at the center of curvature of the primary focal surface, or its reflection in the aforesaid plane mirror. The purpose of this optical system is to match the focal length of the total optical system to the size of the detector and the desired resolution. This detector optical system can be comprised of either reflecting or transmitting elements with spherical or aspherical surfaces.

By the described arrangement the resolution of the overall system is determined by the size of the detector relative to the focal length of the total optical system comprising the primary spherical mirror, the transfer optics assembly between the primary focal surface and the focus on the axis of rotation, and the detector optics. Apertures are therefore not necessary in the primary focal surface to define the resolution of the system, and the rotating grid systems of Harris and Neiswander, and Maxwell, can be eliminated for this purpose. As an example the focal spot size for a spherical mirror optics of 75 mm focal length and 100 mm optical aperture diameter would be about 1.4 mm in the primary focal surface, whereas the effective spot size in the primary focal surface when the overall system is corrected to 0.1 milliradian resolution, would be 0.0075 mm and could be achieved without the use of apertures in the primary focal surface.

Removing the grid of Harris and Neiswander will also remove the facility for comparing the signal from each element of the scene with an adjacent reference, but will result in a greater signal since the blocking effect of the bars of the grid is removed.

In this invention referencing is achieved at the end of each line scan by ensuring that the scan encompasses a reference heat source, and by operating an electronic clamp to restore the base signal level to the reference level at the end of each line scan.

In some circumstances with the arrangement of this invention, and with those of Harris and Neiswander, and Maxwell, when a concave mirror is used as the primary objective, the assembly of scanning components may seriously obscure the radiation incident on the primary mirror from the object field. A further aspect of this invention therefore is an oblique plane mirror arranged so that it receives radiation from a direction parallel to the axis about which the scanning optical assemblies rotate, and directs said radiation on to the primary mirror; the plane of the oblique mirror being arranged to intersect the plane containing the optic axes of the rotating optical assemblies, near the primary focal surface; and the oblique plane mirror being perforated about its center line by an elongated slot to permit radiation from the primary mirror to pass thru the primary focal surface to the rotating optical assemblies.

Where very sensitive detectors of radiation, for example infrared detectors cooled by liquid gases, are used, heat entering the cold detector enclosure from outside the cone of rays forming the image on the detector, causes an increase in detector noise and reduces the detector performance. In the scanning means described in this invention, and in those of Harris and Neiswander and of Maxwell, the aperture in the cooled enclosure, if stationary, must be larger than the cross-section of the cone of rays entering the enclosure. Excess noise will therefore be produced. A further aspect of this invention is therefore to place a perforated spherical mirror of sufficient angular extent, so that its center of curvature is approximately coincident with the detector or the aperture in the cold shield; such mirror, being of low emissivity, effectively preventing excess heat from entering the detector, whilst allowing heat within the cone of rays to enter the detector through the perforation; and being rotated about an axis to follow the cone of rays as it moves due to the scanning motion. Such a mirror to exclude excess heat can still be used to some effect even though stationary, but an elongated perforation is required to accommodate the range of motion of the cone of rays and the exclusion of excess heat is not complete.

Alternatively to rotating the aforesaid perforated mirror to follow the cone of rays from the rotating optical assembly, another aspect of the invention describes a small mirror located at the focal point at the center of curvature of the primary focal surface, which mirror can be either plane or curved, and which moves in a "sawtooth" motion at an angular rate related to the angular rate of the rotating optical assembly and in the same angular sense, so that the cone of rays reflected from said oscillating mirror is directed in a fixed direction. The motion of the small mirror in the same angular sense commences at the beginning of a scan line and flies back rapidly at the end of the scan line ready to commence the next scan. By this arrangement the aforesaid spherical mirror to exclude excess heat may remain stationary and its perforation can be exactly matched to the cone of rays passing through it to the detector.

In some uses of this invention the object field is located at a finite distance from the scanning system and may be flat or curved. A further aspect of this invention is therefore to move the axis of rotation of the scanning member away from the center of curvature of the spherical primary mirror and appropriately change the radius of the scanned focal surface so that all points on the object surface are sharply focussed at the point on the axis of rotation of the scanning optical assemblies.

The foregoing descriptions relate to scanning a single line. Further aspects of this invention describe means to provide a second scan in a direction approximately normal to the first scan.

One method of achieving the second scan is to rotate the scanning optical assembly about an axis perpendicular to the first scan axis.

By extending this method to include a further axis of rotation mutually perpendicular the first two, a compact means is described for providing a second scan and, simultaneously, a stabilization of the line of sight against pitch and yaw motions.

A further method of providing a second scan enables the second scan to extend to continuous rotation through 360°, and simultaneously to provide a means for adjusting the elevation of the second 360° scan.

In summary then, the present invention:
(a) in common with Aulin dispenses with the need for a correcting element in front of the primary mirror, as required by Harris and Neiswander, Maxwell, and Stephenson, but permits the achievement of a much higher relative aperture than with Aulin's arrangement, whilst achieving simultaneously a definition closely approaching the diffraction limit of the optics,
(b) eliminates the need for an element containing a multiplicity of apertures to determine the definition of the system, as with Harris and Neiswander, and Maxwell,
(c) by permitting the use of several detectors simultaneously, enables very much greater performance to be achieved than with a single detector,
(d) by introducing an oblique plane mirror in front of the primary mirror, reduces the obstruction of the incoming radiation by the rotating assembly of scanning optical elements,
(e) introduces means for minimizing the noise in the system due to unwanted radiation entering the detector,
(f) permits the scanning of a plane or curved object field at a finite distance in front of the primary mirror,
(g) permits a two-dimensional field to be scanned in a number of ways; in one example, the second scan being 360°,
(h) permits stabilization of the line-of-sight,
(i) removes rotation of the axis of the cone of rays incident on the detector.

DESCRIPTION OF PREFERRED EMBODIMENTS

Figure 1:
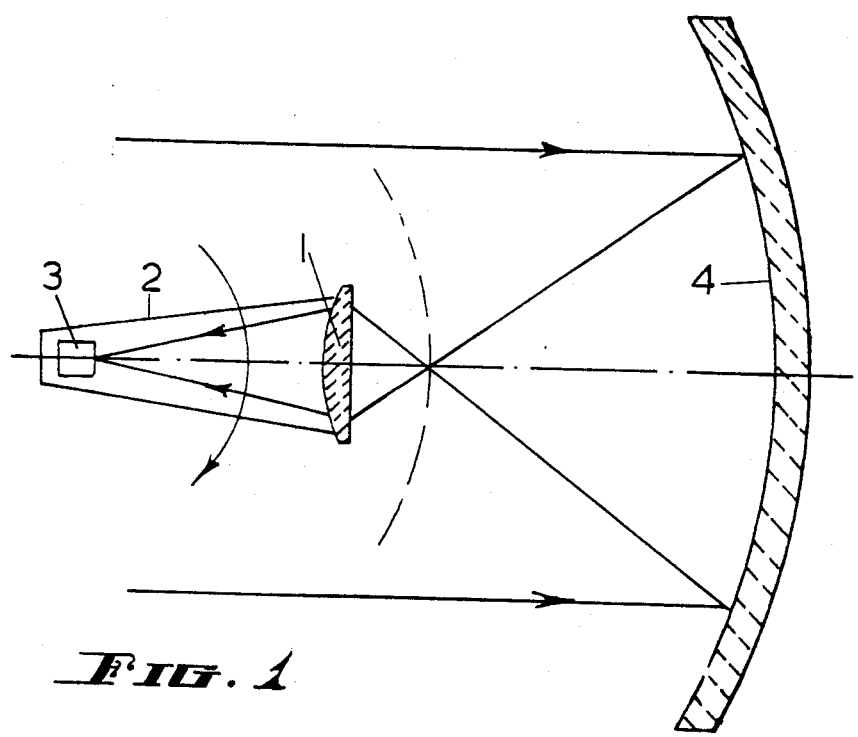
FIG. 1 is a schematic view of an assembly according to this invention showing a simple positive lens, one or both surfaces of which being of aspheric form on a rotating scanning member interposed between a spherical mirror forming a primary focal surface of spherical form, and a detector.

In the drawings similar members are given the same reference numerals.

FIG. 1 shows how an optical system 1 with one or both surfaces of aspheric form is mounted on a rotating member 2 to scan the image of a detector 3 across a primary spherical image surface formed by a fixed mirror 4 to provide a very wide field of view and a high relative aperture with uniformly high resolution across the field, the device in that form giving a single line scan. The detector 3 and the axis of rotation of the rotating member are located on the center of curvature of the primary spherical image surface, and the primary mirror 4 is extended sufficiently to accommodate both the full width of the entering beam and full angular field to be scanned. The dotted line defines the spherical primary image surface at which a diffuse image is formed due to the aberrations caused by the uncorrected primary mirror 4. The aberrations are corrected substantially for the whole system between source and detector by adjusting the shapes and spacings of the surfaces in optical system 1. It will often be necessary to employ several detectors at 3, in which case aberrations occurring off the axis of optical system 1 must be combined with corresponding aberrations due to mirror 4 to produce overall a corrected system.

The effect of this method of correction is as if a precise, demagnified image of the detectors at 3 were projected to the image surface shown dotted, and the angular resolution of a well-corrected system would, ignoring diffraction effects, be determined by the size of the detector image at the primary image surface divided by the focal length of primary mirror 4.

Figure 2:
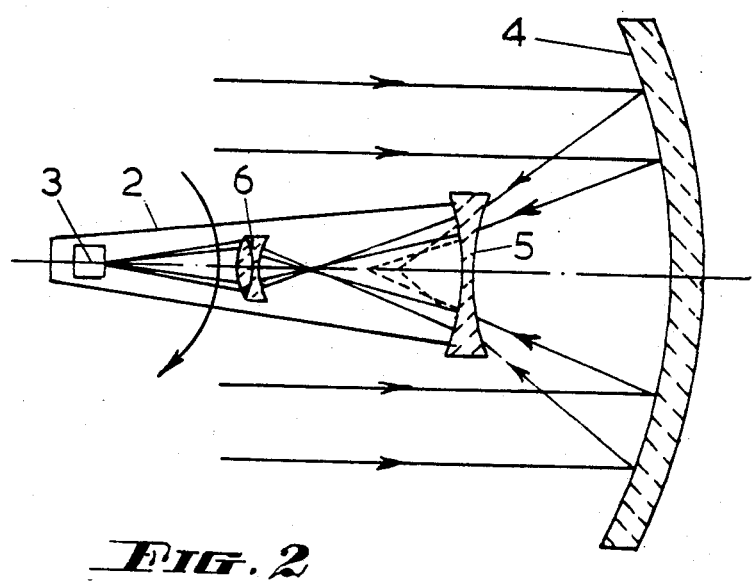
FIG. 2 is a similar view but showing a more complex form of optical system to replace the lens of FIG. 1 to counter aberrations on the primary image surface and including a positive lens to achieve high relative aperture.

The simple optical system 1 of FIG. 1 would provide good correction for image points near to the optical axis of optical system 1, but to provide good correction for image points further from the axis more elaborate optical systems are required. FIG. 2 shows such an optical system comprised of elements 5 and 6 which replace the simple system 1 of FIG. 1, whose optical surfaces are all of spherical form for ease of manufacture, and which provides good correction of aberrations on-axis, and moderate correction off-axis.

Figure 3:
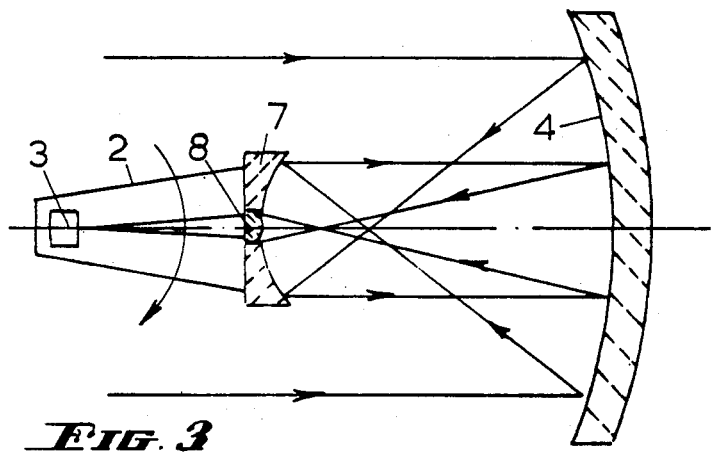
FIGS. 3 and 4 are views showing how a mirror and lens system may replace the single lens, and showing how the primary mirror may be used to fold rays back towards the center in conjunction with either a positive or a negative lens to focus the radiation onto the detector.

FIG. 3 shows how optical system 1 of FIG. 1 can be replaced by an optical system comprised of mirror element 7, a second mirror element which is in reality portion of primary mirror 4, and a transmitting element 8, and in which the surfaces of 7 and 8 are adjusted to correct overall for aberrations.

Figure 4:
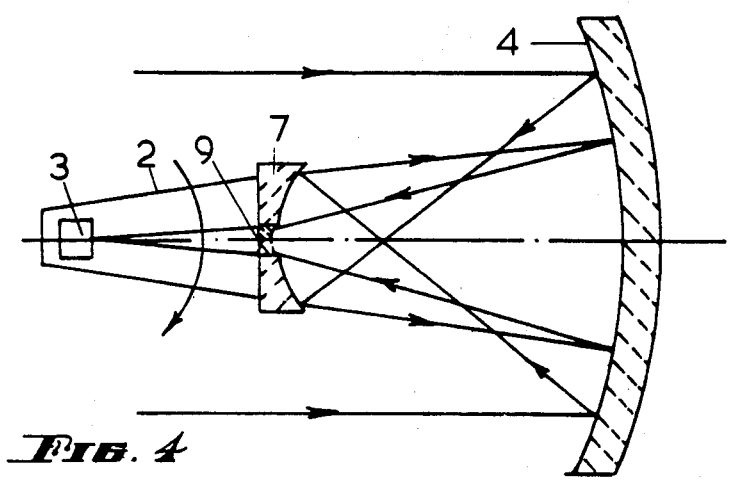

FIG. 4 shows a similar arrangement to FIG. 3 in which the positive element 8 in FIG. 3 is replaced by negative element 9 in FIG. 4.

Figure 5:
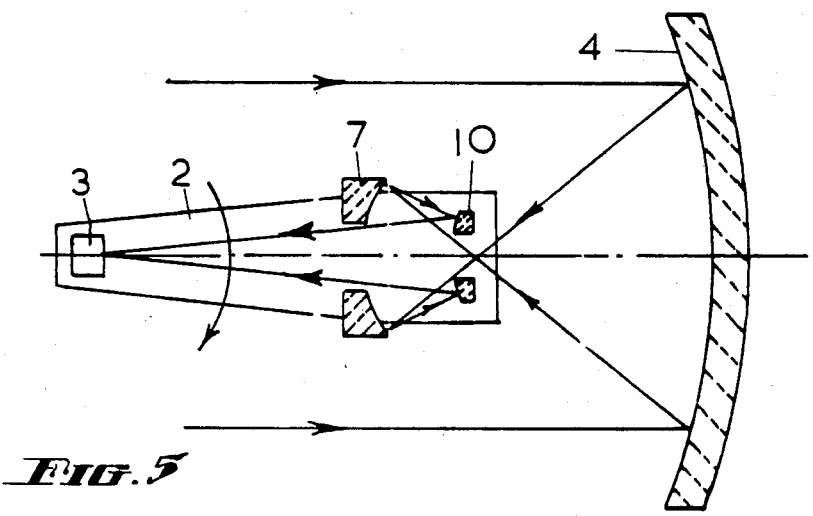
FIGS. 5 and 6 are schematic views of preferred arrangements having a folded ray path provided by a folding mirror on the rotating member which can also assist in correcting aberrations. An obvious extension of FIGS. 3, 4, 5 & 6 is to include an optical system of positive power before the detector according to FIGS. 1 and 2 to increase relative aperture. In all FIGS. 1 to 6 an intermediate real focus is available.
Figure 6:
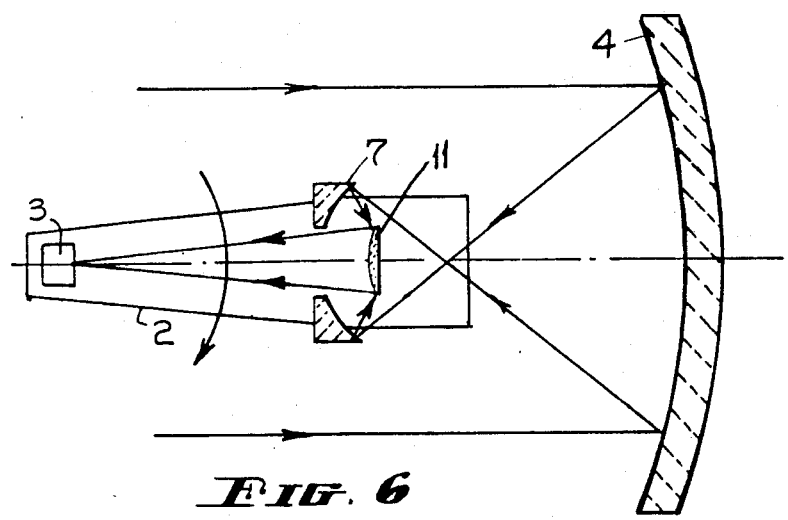

FIG. 5 illustrates an optical system comprised of two reflecting elements, secondary mirror 7 and tertiary mirror 10, which replace optical system 1 in FIG. 1. FIG. 6 illustrates an alternative arrangement comprised of reflecting elements, secondary mirror 7 and tertiary mirror 11. In FIG. 5 the rays from primary mirror 4 pass through an aperture in tertiary mirror 10, whereas in FIG. 6, the rays from primary mirror 4 pass outside tertiary mirror 11.

In all the arrangements of FIGS. 1 to 6 an intermediate real focus is provided at which a small reference source can be conveniently located.

Figure 7:
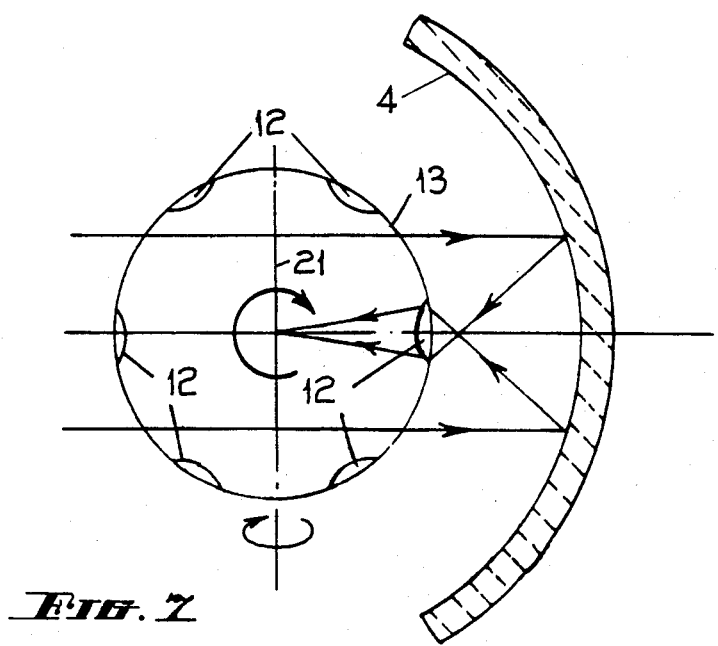
FIG. 7 is a schematic view showing how a series of correcting optical systems can scan the image surface of a primary mirror.

The secondary lens or mirror corrector elements corresponding to optical system 1 of FIG. 1 may be multiplied about the axis of rotation of the rotating member, which, for example, could be disc-shaped as shown in FIG. 7. Each optical system 12 will generate a scan line and the maximum possible angular field of view will be determined by the number of optical systems equally spaced around the periphery of rotating member 13.

Although the detector could be mounted on the rotating member, this is not normally convenient, especially if, as in the case of sensitive infrared detectors, cooling by liquid gases is required. A stationary detector can be mounted at the axis of rotation of the rotating member, and the center of the primary image surface, as described by Aulin, and by Maxwell, or alternatively, on the axis of rotation of the rotating member only, by deflecting the radiation generally along the axis of rotation by means of a multisided pyramidal reflector, as described by Harris and Neiswander, although in the latter case difficulty will be experienced where many detectors are used due to rotation of their image in the object field.

Figure 8:
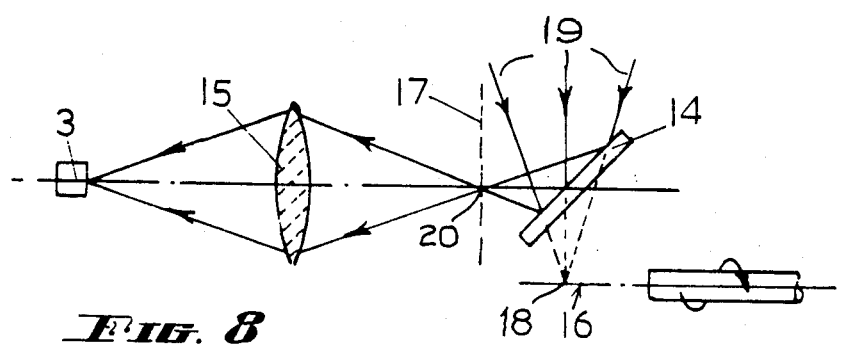
FIG. 8 shows one means for diverting radiation to a stationary detector in a convenient position.

Due to this image rotation with the pyramidal arrangement, the former method of locating the detector at the center of curvature of the primary image field is preferred. However to locate the detector at the actual center of curvature of the primary image surface could prove to be inconvenient in which case the arrangement of FIG. 8 may be used. In FIG. 8, 18 is the actual center of curvature of the primary image surface and 16 the actual axis of rotation of the rotating member 13 of FIG.

7. Rays 19 from the optical system 12 of FIG. 7 are directed on to the plane mirror 14 which is stationary with respect to the detector 3 and the primary mirror 4 of FIG. 7, and arranged to direct the rays 19 generally parallel to axis of rotation 16 to focus at 20. Point 20 and dotted line 17 are images in mirror 14 of focal point 18 and axis of rotation 16. The detector may be placed at 20, or, if a higher relative aperture is desired the rays can be refocused by a positive optical system 15 to position 3.

The means so far described generate one scan direction only. They are appropriate for use where a vehicle such as an aircraft carries the equipment forward in a direction at right angles to the given scan direction, to generate a second scan.

In order to generate a second scan at right angles to the first scan when the device of FIG. 7 is used, the rotating member 13 on which the secondary optical systems are mounted may be rotated about an axis perpendicular to its own axis. Either the whole system including the primary mirror may be rotated, or the primary mirror may remain fixed but is extended in the direction of the second scan.

The direction of the axis of rotation of the rotating member 13 is immaterial as far as this invention is concerned and can be arranged to suit the application. However if, for example, the axis of rotation is vertical to generate a horizontal scan line, maintaining the axis vertical by suitable means, while the member connecting the primary mirror and the detector rotates, as for example, due to motion of a vehicle on which it is mounted, will cause the line-of-sight to be held constant. Provided the primary mirror 4 is extended sufficiently to accommodate the full width of the entering beam, the full angular fields to be scanned by the first and second scans, and the rotational angles due to motion of the vehicle, this stabilization will be achieved without loss of sensitivity or resolution over the whole of the scanned field.

Figure 9:
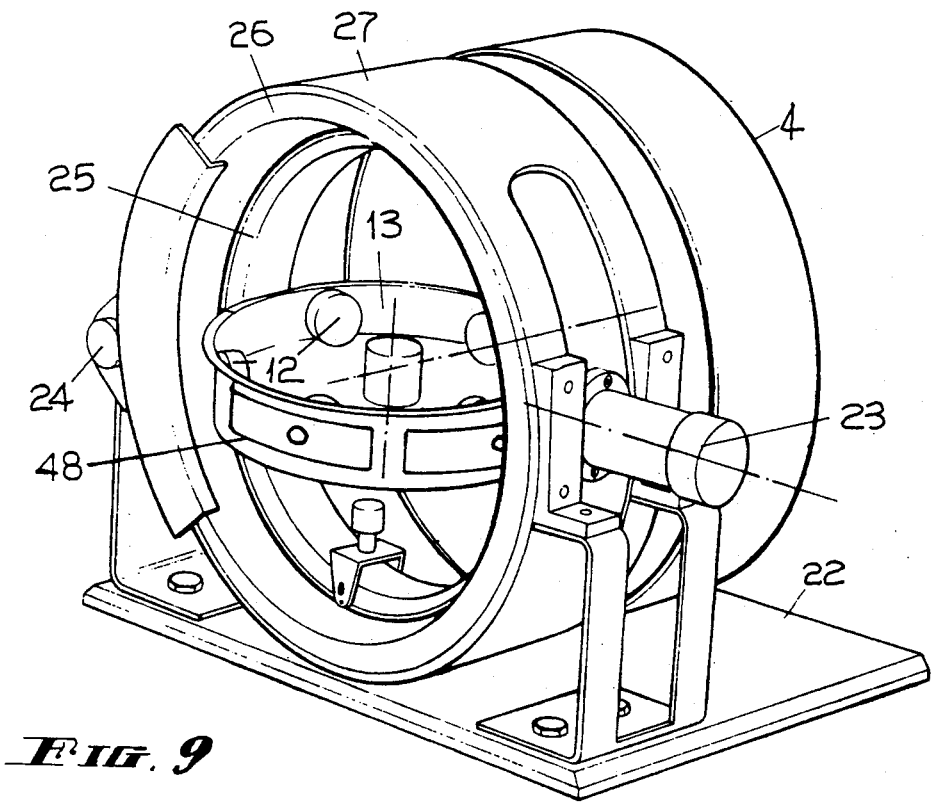
FIG. 9 is a perspective view of an infrared scanner having a spherical mirror and a rotating auxiliary optical system on a rotating member as arranged for use on a movable platform such as a vessel to stabilize the line-of-sight.

The device shown in FIG. 9 is arranged for use on a moving platform such as a vessel and has the necessary compensation to maintain horizontal and vertical axes in correct relationship to the area being scanned and comprises a spherical main mirror 4 having a series of correcting optical systems 12 arranged on a rotating member 13 which is mounted to revolve in a case 22 to effect vertical scan adjustment, the mirror 4 being arranged to give a large angle of scan in association with the multiplicity of correcting lenses, means being provided to effect adjustment between the base 22 and the main axle, comprising a pair of servo-motors 23 and 24 one of which maintains the spinning member axis which is supported by a ring 26 which can rotate in the fixed frame 27 about the axis of symmetry of the mirror, the device being arranged to transmit the collected data along the horizontal axis of the device to a detector which is preferably liquid cooled and is mounted on the ring 25 to facilitate the application of the liquid cooling to the detector, the device using the principles explained with reference to the earlier drawings.

Figure 10:
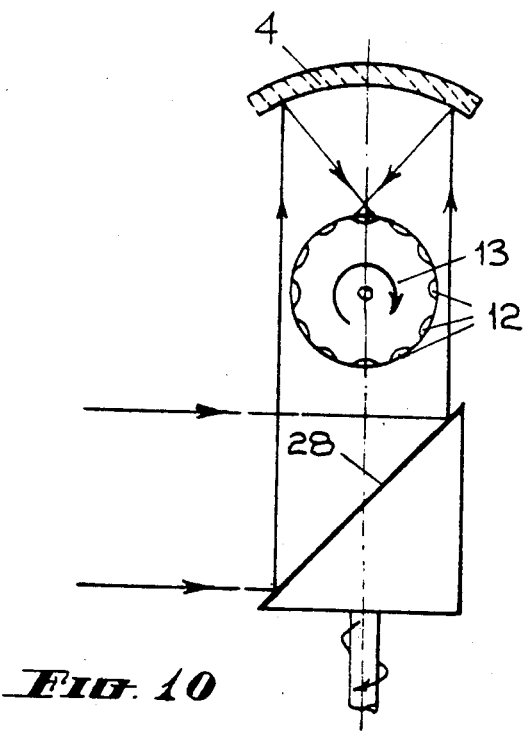
FIG. 10 is a schematic view showing how a fast scanning array can be used with an oblique plane mirror to give an all-round scan, as well as an adjustment in elevation.

A convenient alternative arrangement is shown in FIG. 10, in which a plane mirror 28 is used to bend the optic axis of the incoming beam of radiation approximately through a right angle. Rotation of this mirror 28 about a vertical axis provides a 360° scan. By tilting the plane mirror 28, the mean elevation of this scan may conveniently be changed. Rotating the first scan member 13 holding the auxiliary lenses 12 in a plane parallel to the horizontal beam of incoming radiation provides a vertical scan of the field of view in the stationary primary mirror 4, which must be sufficiently extended to accommodate the full width of the entering beam, the vertical scan angle, and any rotations of the vehicle on which the system is mounted, means being provided to hold the axis of rotation of the rotating member 13 in a fixed horizontal plane for stabilization of the line-of-sight.

Figure 11:
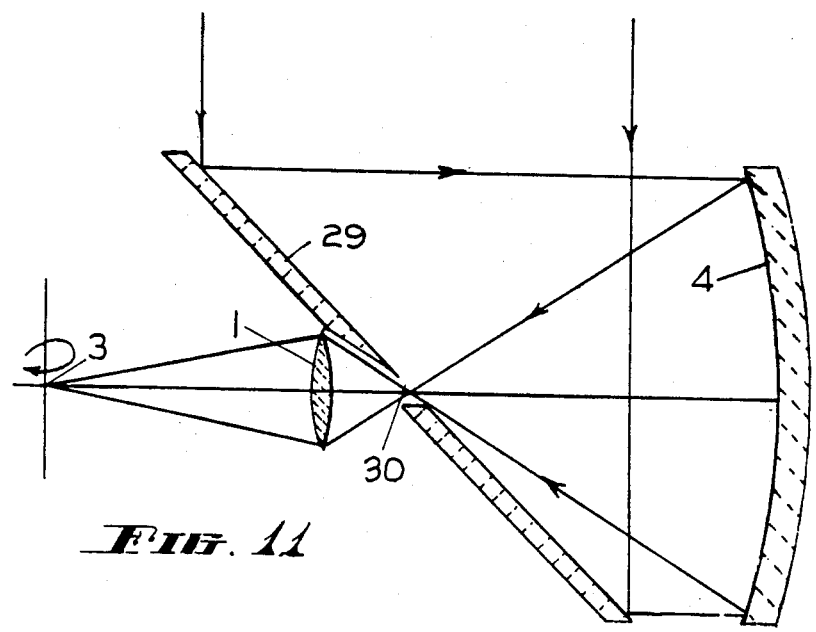
FIG. 11 is a schematic view showing one way in which a diagonal plane mirror can be inserted between the scanning optics and the primary mirror to reduce the obscuration of the incoming rays by the structure supporting the scanning optics, and the detector.

Should the structure supporting the rotating member 13 be large it will obstruct seriously the rays entering the primary mirror 4. FIG. 11 shows how a diagonally placed mirror 29 between the scanning optics of for instance the optical system 1 and the primary mirror 4 and with a central, suitably shaped aperture 30 can be used to avoid the obstruction by the scanning optics. This arrangement could be used as an alternative to that of FIG. 10, mirror 29 of FIG. 11 performing the field rotating and elevation functions of mirror 28 of FIG. 10, whilst affording the additional functions of minimizing obscuration of mirror 4 by the mechanical arrangements associated with the detector 3 and rotating member 13.

Figure 12:
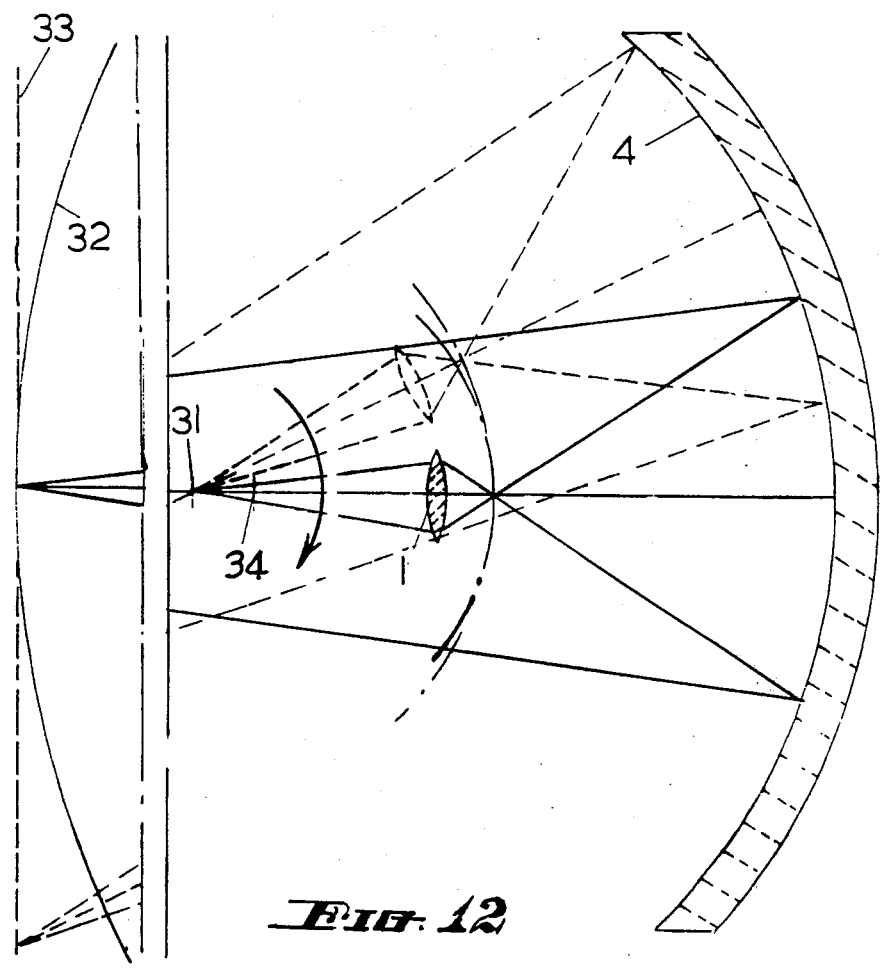
FIG. 12 is a schematic view showing how a flat object field close to the scanning equipment can be scanned by slightly offsetting the center of rotation of the scanning optics from the center of curvature of the primary mirror.

The previous descriptions refer to the case where the objects being scanned and being close to the scanning system must be on a curved surface to be sharply in focus. FIG. 12 shows how, by displacing the center of rotation of the scanning optics assembly from the center of curvature of the primary mirror, away from the primary mirror, a flat object field may be produced if desired.

In FIG. 12, the optical system 1 represents the auxiliary scanning optics and 4 the stationary primary mirror, 34 indicating the center of curvature of the primary mirror, 31 showing the axis of rotation of the secondary scanning system. The normal curved object field with 31 and 34 coincident is designated 32 and the flat field achieved by the displacement of 31 and 34 is designated 33. Of course, a wide range of curvature of object surface can be achieved by this method by different degrees of displacement of the center of curvature from the axis of rotation.

Where detectors of radiation, for example, infrared detectors cooled by liquid gases are used, in the case of the most sensitive detectors, heat entering the cold detector enclosure from outside the cone of rays imaging the object, cause an increase in detector noise and reduce its performance. In the scanning means described above, the aperture of the cooled enclosure must be much larger than the cross-section of the cone of rays entering the enclosure. Excess noise will therefore be produced.

Figure 13:
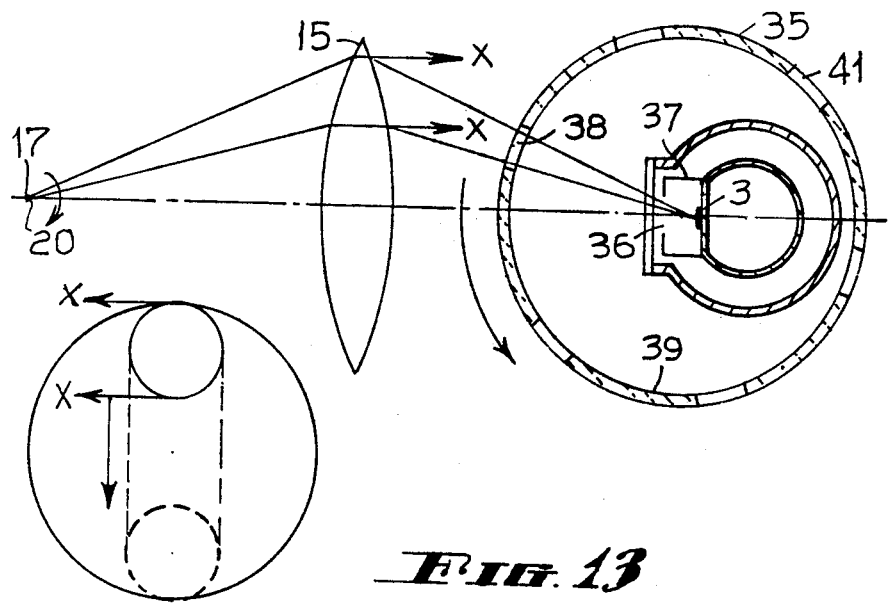
FIG. 13 shows how a rotating, apertured spherical mirror can be located with its center of curvature at the detector element to improve the efficiency of the detector, in the case where, as in FIG. 8, a focal point is formed at the center of curvature of the primary image surface or its image in a plane mirror.

FIG. 13 shows how this excess noise can be reduced significantly. If a spherical mirror 35 with internal mirrored surface 39, is placed to surround the detector 3 so that its center of curvature lies within the detector element, and if the mirror 35 is sufficiently large that the detector sees only the mirror thru the aperture 36 in the cold shield 37, the radiation from behind the mirror will be prevented from striking the detector.

Also since a reflecting surface emits very little radiation and only cold areas inside the enclosure will be imaged on to the detector 3 by the mirror 35, insignificant radiation will be incident on the detector from in front of the mirror. The effect is as if the detector were completely enclosed in a cooled cavity. If now the mirror is perforated by an aperture 38 of suitable size and suitable shape and if also the mirror 35 is rotated about an axis parallel to the axis 17 about which the incoming cone of rays is rotating, as for example in FIG. 8, excess radiation will be excluded from entering the detector enclosure while permitting the rays imaging the object to strike the detector, thus reducing detector excess noise to a minimum.

On the left of FIG. 13 is shown the projection of rays from the scanning optics on the surface of the member 15, showing the passage of the cone of rays across the member 15.

Figure 14:
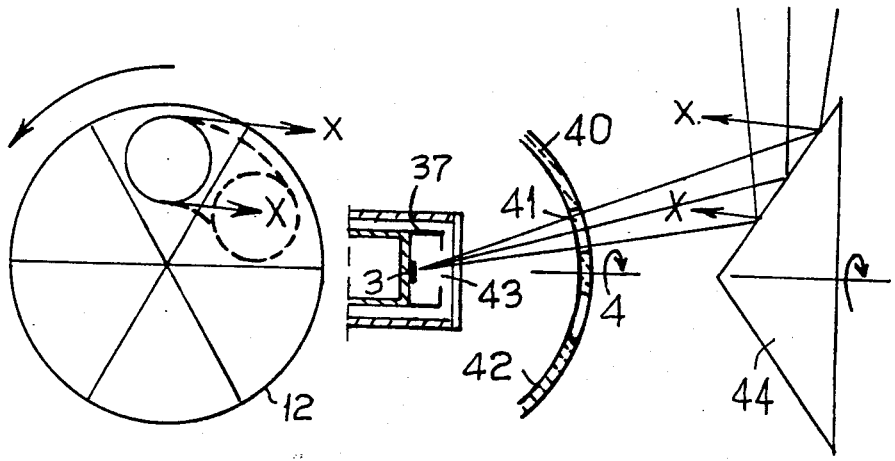
FIG. 14 shows an arrangement corresponding to the case of FIG. 8, similarly, to increase the efficiency of the detector, when a pyramidal mirror is used to divert radiation from the rotating member to a focal point on the axis of rotation of the rotating member.

FIG. 14 illustrates a corresponding arrangement for the device of Harris and Neiswander which uses a reflecting pyramidal prism to direct the rays on to the detector.

In this case the spherical mirror 40 is placed in front of detector 3 and has apertures 41 thru it and an internal reflective surface 42. The cold shield is designated 43, and the projection of the rays on the faces of the pyramid from the collecting optics is shown on the left, in this case a circular scan instead of a linear scan. The mirror 40 is rotated about the same axis as pyramid 12, the detector 3 being located on that axis.

Figure 15:
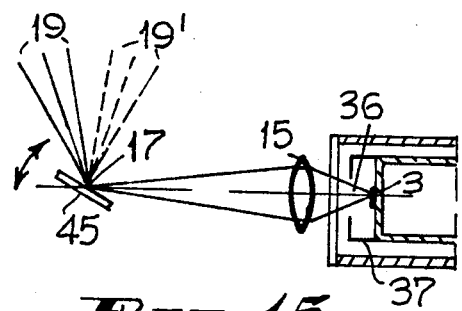
FIG. 15 shows how a small oscillating mirror located at the focal point at the center of curvature of the primary image surface or its reflection in a mirror as in FIG. 8, can be used to produce a steady cone of rays incident on the detector through an auxiliary optical system.

A further convenient arrangement which is suitable when there is a focal point at the center of curvature of the primary image surface, is shown in FIG. 15.

In FIG. 15, the cone of rays 19 from rotating system 12 of FIG. 7 is rotating from position 19 to position 19', and is incident on small mirror 45 located at focal point 20 corresponding to focal point 20 of FIG. 8. Small mirror 45 is rotated about an axis 17, as in FIG. 8, coincident with 20 and parallel to the axis of rotation of rotating member 13. The surface of small mirror 45 may be generally parallel to axis 17 passing thru the point 20 or inclined to the axis. Small mirror 45 rotates in the same sense of rotation as the rotating member 13, at an angular speed and thru an angle dependent on the inclination of small mirror 45 to axis 20. For example if small mirror 45 lies parallel to the axis which pass thru the point 20, it will rotate at half the angular speed of the rotating member, and thru an angle equal to half the angular field of view, or, if small mirror 45 is inclined at 45° to the axis it will rotate at the same angular speed as rotating member and thru an angle equal to the angular field of view. At the end of the scan line the mirror 45 is returned rapidly to its initial position corresponding to the beginning of the scan line. The effect of this arrangement is to maintain the cone of rays reflected from mirror 45 stationary in space during the scan period so that the optical system 15 can be made simpler and the aperture 36 in the cold shield 37 can accurately match the incoming cone of rays. This arrangement is especially advantageous when high relative apertures are desired.

I claim:

1. A method of scanning the image of a detector along a scan line in the field of view from which to detect objects in the field of view, which comprises:
   (a) positioning a primary collecting spherical mirror of wide angular field to collect radiation from the field of view, said primary spherical mirror forming a spherical primary image surface containing uncorrected aberrations due to said primary mirror being spherical said aberrations being distributed uniformly over the said primary image surface,
   (b) locating an auxiliary optical system between the primary optical system and the center of curvature of the primary image surface and arranged to scan the image field of the said primary spherical mirror by moving about an axis passing through the center of curvature of the said primary image surface,
   (c) correcting the aberrations of the primary spherical mirror by adjusting the spacings and shapes of the surfaces of the said auxiliary optical system to provide aberrations of opposite sign and equal magnitude to the aberrations produced by the primary spherical mirror,
   (d) directing the corrected radiation from said auxiliary optical system on to a further detector optical system which focuses said corrected radiation on to a detector, whereby to produce an improved definition scanning system with wide field of view and at large relative aperture.

2. Means for scanning the image of a detector along a scan line in the field of view from which to detect objects in the field of view, comprising a primary collecting optical system consisting of a spherical mirror of wide angular field arranged to collect radiation from the field of view, said primary spherical mirror providing an image on a spherical image surface containing aberrations due to said primary mirror being spherical, said aberrations being distributed uniformly over the field of view, an auxiliary optical system mounted on a rotating member the axis of which is located at the center of curvature of the said primary image surface, said auxiliary optical system being arranged to compensate for the aberrations of the said primary spherical mirror by adjusting the spacings and shapes of the surfaces of the said auxiliary optical system to provide aberrations of opposite sign and equal magnitude to those produced by the primary spherical mirror, whereby the said auxiliary optical system scans the primary image surface and directs said radiation on to a further detector optical system arranged to focus said radiation on to a detector to produce an improved definition at high relative aperture uniformly over a wide field of view in a compact arrangement.

3. Means according to claim 2 for providing an improved definition in the scanning beam at high relative aperture, wherein the secondary surfaces are spherical or aspherical, transmitting or reflecting and the components of the said auxiliary optical system and said detector optical system have new positive power to attain high relative aperture.

4. Means according to claim 2 characterized by means for providing compensation of spherical aberration and partial compensation of coma, in which the said auxiliary optical system comprises one secondary aspheric reflecting surface in conjunction with the surface of the primary spherical mirror to direct the beam towards the center of curvature of the primary image surface.

5. Means according to claim 2 characterized by means for providing compensation of spherical aberration and coma, in which the said auxiliary optical system comprises two secondary aspheric reflecting surfaces, both mounted on the rotating member, wherein the final image is directed towards the center of curvature of the primary image surface.

6. Means according to claim 2 further characterized by a stationary mirror for directing the radiation from the optical elements mounted on the rotating member onto a stationary detector, wherein the image of the source is focused at a secondary focus on the axis of rotation in the absence of the said mirror, said mirror when inserted being oriented to provide a convenient position in space of the image of the axis of rotation, and radiation from said mirror is collected by a stationary detector optical system and focused on the stationary detector.

7. Means according to claim 2 for reducing obscuring of the said primary mirror to the said incident radiation, characterized by an inclined plane mirror disposed about the curved primary image surface of the said primary mirror and apertured generally parallel to the plane of rotation of said auxiliary optical system to allow said radiation from the said primary mirror to pass thru the apertured plane mirror to the said auxiliary optical system.

8. Means according to claim 2 further characterized by means for reducing noise, in which a secondary spherical ray-intercepting mirror is positioned to rotate between the primary image surface and the detector and is apertured to shield the said detector against rays excepting those passed to the detector by the primary mirror, said secondary ray-intercepting mirror being synchronized with the secondary optics to follow the scan, and being so oriented that its reflecting surface or reflection thereof in mirrors located between said ray-intercepting mirror and the detector, is directed towards the detector.

9. Means according to claim 2 further characterized by means to remove rotation from the axis of the cone of rays emerging from the secondary focus of the auxiliary optical system located at the center of curvature of the primary image surface, in which a small moving mirror is positioned at the said secondary focus of said auxiliary optics on the rotational member, and is arranged to rotate in the same sense as the rotating member, whereby to remove lateral rotation about the said axis of rotation of the axis of the cone of rays reflected from said small moving mirror and so to allow a smaller optics to be used to focus said radiation on to the detector, and to allow the noise reducing mirror according to claim 12 to remain stationary, said small moving mirror commencing its movement in the same angular sense as the rotating member at the beginning of a scan line, and returning rapidly to its initial position at the end of the scan line ready to commence the next scan.

10. Means according to claim 2 further characterized by means for providing a second scan axis to give a two-dimensional scan, wherein the rotating member is rotated about a second axis passing through the center of curvature of the primary image surface, said axis preferably being normal to the other axis of rotation, and said primary spherical mirror being stationary, but extended about said second axis of rotation.

11. Means according to claim 2 further characterized by means for providing a second scan axis to give a two-dimensional scan, in which the said rotating member is rotated about a second axis passing through the center of curvature of the primary image surface, said axis being normal to the other axis of rotation, and said primary spherical mirror being arranged to rotate about said second axis of rotation.

12. Means according to claim 2 characterized by means for providing a second scan axis to give a two-dimensional scan, in which a plane mirror reflects radiation into the primary spherical mirror, said plane mirror and primary spherical mirror and the rotating member rotating about the primary axis and detector being mounted to rotate about an axis at right angles to the primary axis of rotation, to provide a second scan of 360° or less as required and said plane mirror being rotatable about an axis set parallel to the primary axis of rotation to vary the position of the field of view.

13. Means according to claim 2 in which the line-of-scan of the scanner in the object space is held stationary, while the primary mirror rotates due to roll, pitch and yaw motions, by holding the plane of rotation of the scanning optics fixed with respect to a fixed reference axis.

14. Means for scanning the image of a detector along a scan line in the field of view, from which to detect objects at improved definition at high relative aperture in the field of view, said means comprising a support, a primary mirror mounted on said support, said primary mirror providing a spherical primary image surface, a rotational member also mounted on said support having its axis of rotation at the center of curvature of the said primary image surface, means to drive the said rotational member, an auxiliary aberration compensating optical system mounted on the said rotational member which collects radiation from said primary mirror and focuses it at a secondary focus on the axis of rotation of said rotating member, and a further detector optical system located between the secondary focus and a detector, said detector optical system focusing radiation from the said auxiliary optical system on to the said detector, the axis of rotation of the said rotational member being positioned in relation to the center of curvature of the spherical mirror to scan a curved or a plane surface, in the field of view.

* * * * *